United States Patent Office 3,838,140
Patented Sept. 24, 1974

3,838,140
MOLECULAR WEIGHT REGULATION IN
CHLOROPRENE POLYMERS
Rudolf Mayer-Mader, Cologne, and Jurgen Boldt, Opladen, Germany, assignors to Bayer Aktiengesellschaft, Leverkusen, Germany
No Drawing. Filed Nov. 9, 1972, Ser. No. 305,134
Claims priority, application Germany, Nov. 13, 1971, P 21 56 452.3
Int. Cl. C08d 3/14; C08f 1/80, 3/32
U.S. Cl. 260—92.3      4 Claims

ABSTRACT OF THE DISCLOSURE

A process for polymerising a monomer composition of chloroprene and 0 to 50% by weight of one or more other copolymerisable monomers in aqueous emulsion on radical forming catalysts in the presence of a selected dialkoxy-xanthate disulphide and a mixture of the polymer thus obtained with a benzene insoluble cross-linked chloroprene polymer.

---

It is known to polymerise chloroprene in the presence of dialkylxanthogendisulphides as molecular weight regulators (see British Patent No. 512,458). It is also known to use mercaptans for regulating the molecular weight (see U.S. Patent No. 2,567,117).

If polymerisation is stopped when not more than 70% of the monomers have reacted, the polychloroprenes obtained by these methods are soluble in benzene, i.e. they are not crosslinked. Polychloroprene polymers which are particularly easy to process are obtained by mixing such benzene soluble polychloroprenes which are not crosslinked with cross-linked benzene insoluble chloroprene polymers (see British Patent No. 1,158,970 and German Offenlegungsschrift No. 2,008,673).

These mixtures, however, have insufficient thermal stability if dialkylxanthate disulphides are used as molecular weight regulators (their Mooney viscosity increases on exposure to heat) and insufficient mechanical strength when mercaptans are used as molecular weight regulators.

This invention relates to a process for polymerising a monomer composition comprising chloroprene and 0 to 50% by weight based on total monomer composition of one or more copolymerisable monomers in an aqueous emulsion on radical forming initiators, in the presence of 0.1 to 20 parts by weight per 100 parts by weight of monomer composition of a dialkoxyxanthogendisulphide of the formula

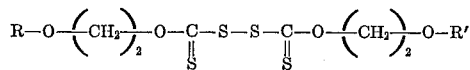

in which R and R' represent methyl or ethyl.

The basic polymerisation process of chloroprene is known in the art, see e.g. U.S. Patents Nos. 3,042,652; 3,147,317 and 3,147,318.

In the process of this invention, the dialkoxyxanthogen-disulphides of Formula I are generally used in quantities of 0.1 to 20 parts by weight per 100 parts of monomers, preferably 0.15 to 1 part by weight. Dialkoxyxanthogen-disulphides of Formula I are known.

Polymerisation is carried out in aqueous emulsion using a polymerisation catalyst which forms free radicals, e.g. an alkali metal persulphate (such as potassium persulphate). Any of the usual emulsifiers may be used for preparing the monomer emulsion. These include water-soluble salts, in particular sodium or potassium salts of the following types of compounds: long chain fatty acids, colophony or colophonyl derivatives, e.g. colophony obtained from wood, tall oil colophony, disproportionated colophony or partly polymerised colophony, higher alcohol sulphates and aryl sulphnic acids, e.g. alkylbenzene sulphonic acids, and the condensation product of formaldehyde with a naphthalene sulphonic acid.

The concentration of the organic monomer in the emulsion used as starting material is not of decisive importance. It is generally 30 to 60%, based on the total weight of the emulsion when preparing the polymer.

The pH is preferably in the alkaline region. Polymerisation may be carried out at temperatures of between 0° C. and 80° C. and is preferably carried out between 30° C. and 50° C.

Polymerisation is stopped when monomer conversion has reached a stage at which a polymer which is soluble in benzene is obtained. The appropriate point at which polymerisation is stopped depends to a certain extent on the amount of dialkoxyxanthogendisulphide used but is generally at a monomer conversion of about 50 to 70%. The usual "stopping agents" such as those indicated in U.S. Patent 2,576,009 are used for stopping polymerisation. Unreacted monomer is removed in known manner, e.g. by steam distillation as described in U.S. Patent No. 2,467,769.

Up to 50% of the chloroprene may be replaced by some other copolymerisable monomer. Suitable comonomers for this purpose are, for example, vinyl aromatic compounds such as styrene, vinyl toluenes and vinyl naphthalenes, aliphatic conjugated diolefine compounds such as 1,3-butadiene, isoprene, 2,3-dimethyl-1,3-butadiene and 2,3-dichloro-1,3-butadiene, vinyl ethers, esters and ketones such as methylvinylether, vinyl acetate and methylvinylketone, and esters, amides, and nitriles of acrylic acid and methacrylic acid such as ethyl acrylate, methyl methacrylate, methacrylamide and acrylonitrile.

This invention also relates to a mixture of a benzene soluble uncross-linked chloroprene polymer (a) and a benzene-insoluble cross-linked chloroprene polymer (b), wherein the benzene-soluble chloroprene polymer is a polymer of chloroprene and if desired of up to 50% by weight (based on the monomer mixture) of another copolymerisable monomer which has been obtained in the presence of 0.1 to 20 parts by weight per 100 parts by weight of monomer of a dialkoxyxanthate disulphide of the formula

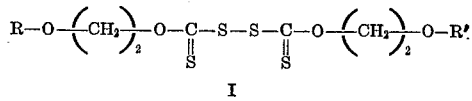

I in which R and R' represent methyl or ethyl.

The benzene soluble chloroprene polymer in this mixture is therefore the product whose preparation has been described above.

Benzene insoluble cross-linked chloroprene polymers suitable for the mixture with the soluble chloroprene polymer described above may be prepared by various processes which yield a cross-linked polymer in latex form. For example, chloroprene may be polymerised to a high conversion (i.e. about 90 to 100%) in the absence of a chain transfer agent or with only small quantities of such a substance, e.g. an alkyl mercaptan or dialkoxyxanthogendisulphide. A suitable process resulting in high conversion has been described in U.S. Patent No. 3,147,317. Another method of forming a cross-linked chloroprene polymer consists in including in the polymerisation system a monomer which is copolymerised with chloroprene and which contains two or more polymerisable double bonds. Suitable comonomers for this purpose are, for example, divinylbenzene and esters of acrylic acids and polyhydroxy compounds such as alkylene glycols, dihydroxybenzene or trimethylolpropane.

These polymerisations are effected by the same methods which yield benzene soluble chloroprene polymers but monomer conversion can be higher, e.g. up to 90 to 100%.

Another method of producing cross-linked chloroprene polymers which are suitable for the purposes of this invention consists in subjecting the latex of an uncross-linked chloroprene polymer to an after-treatment by which the polymer in the latex is cross-linked. Examples of suitable methods are irradiation with actinic light as in U.S. Patent No. 3,042,652 and treatment with an organic peroxy compound as in U.S. Patent No. 3,147,318.

In the preparation of the cross-linked chloroprene polymer, up to about 20% of the chloroprene may be replaced by another monomer. Examples of such monomers have been mentioned above in the description of the preparation of the benzene soluble chloroprene polymer.

The benzene insoluble chloroprene polymer preferably used is a copolymer of chloroprene and 2 to 20% by weight, based on the quantity of chloroprene, of a diester of dihydric aliphatic alcohol and an acrylic acid. These diesters correspond to the formula, $$H_2C=C-C-O-X-O-C-C=CH_2$$
$$\quad\ |\ \ \|\quad\quad\quad\|\ \ |$$
$$\quad R^1\ O\quad\quad\quad O\ R^2 \qquad\qquad II$$

in which $R^1$ and $R^2$ represent hydrogen, alkyl radicals containing 1-4 carbon atoms or chlorine and X represents an alkylene radical with 2-20 carbon atoms. Examples of such compounds are: ethylene dimethacrylate, propylene dimethacrylate, butylene dimethacrylate, isobutylene dimethacrylate, ethylene diacrylate, propylene diacrylate, butylene diacrylate and isobutylene diacrylate.

The polymerisation process for the preparation of these products is similar to the usual method of polymerisation of chloroprene in aqueous emulsions. The process and the products obtained by it have been disclosed in British Patent No. 1,158,970.

Preferably the components of the chloroprene polymer mixture are mixed by first thoroughly mixing the latices and then isolating the polymer mixture by the usual methods, e.g. by coagulation by freezing (as described in U.S. Patent No. 2,187,146) or by roller drying (as described in U.S. Patent No. 2,914,497). Alternatively, the chloroprene polymers may first be isolated by the usual methods and then be mixed by mechanical methods, e.g. by kneading on mixing rollers or mixing in an internal mixer, e.g. a Banbury mixer or a Werner-Pfleiderer mixer.

The ratio of benzene soluble chloroprene polymer (a) to cross-linked chloroprene polymer (b) may be about 20:1 to 1:1. At least half the mixture should consist of benzene soluble component (a) modified with dialkoxy-xanthogendisulphide.

It is preferred to use a ratio of benzene soluble chloroprene polymer to cross-linked (gel) chloroprene polymer of 1:1 to 4:1.

The polychloroprene mixtures according to the invention can be processed into rubber mixtures and vulcanised in the same way as ordinary polychloroprenes. They may be used for all purposes for which polychloroprenes are suitable. Their particular advantage lies in their improved processing properties with those of benzene soluble polychloroprenes and benzene insoluble polychloroprenes. Their stability to thermal stress is substantially improved in comparison with known mixtures of benzene soluble and benzene insoluble polychloroprenes.

EXAMPLES

1. Preparation of benzene soluble polychloroprenes with di-(3-oxapentyl-1) xanthogendisulphide A monomer mixture of 100 parts by weight of chloroprene and X parts by weight of di-(3-oxa-pentyl-1)-xanthogendisulphide and a mixture of 120 parts by weight of demineralised water,
5 parts by weight of the sodium salt of a disproportionated abietic acid,
0.5 parts by weight of the sodium salt of a condensation product of naphthalene sulphonic acid and formaldehyde,
0.5 parts by weight of sodium hydroxide and
0.5 parts by weight of tetrasodium pyrophosphate were prepared separately.

The monomer mixture is emulsified in the aqueous phase, the emulsion is heated to 43° C. and polymerisation is initiated by dropwise addition of an activator solution of 2.5 parts by weight of formamidine sulphinic acid and 97.5 parts by weight of water.

Polymerisation is stopped when 65–70% of the monomers have been converted, the remaining monomers are removed by steam distillation and a sample of the polymer is isolated from the resulting latex by electrolyte precipitation followed by drying.

The experiment was carried out with various quantities of di-(3-oxapentyl-1)-xanthogendisulphide. The results are shown in Table I.

TABLE I

| Experiment: | Parts by weight of xanthate disulphide | Mooney viscosity ML-4' (100° C.) of the polymer |
|---|---|---|
| 1 | 0.3 | >200 |
| 2 | 0.5 | 140 |
| 3 | 0.5 | 59 |
| 4 | 0.55 | 42 |
| 5 | 0.60 | 34 |
| 6 | 0.65 | 28 |

The Mooney viscosity, which is indicative of the molecular weight of the product, decreases with increasing quantity of xanthogendisulphide.

II. Preparation of a benzene soluble polychloroprene using diisopropyl xanthogendisulphide as molecular weight regulator (Experiment carried out for comparison)

The experiment is carried out in the same way as Example I but using 0.59 parts by weight of diisopropyl xanthogendisulphide as molecular weight regulator. The polymer obtained has a Mooney viscosity of M1-4' (100° C.)=42.

III. Preparation of a benzene insoluble polychloroprene

The following components are introduced into a 40 litre autoclave equipped with stirrer, thermometer, inlets and a cooling system:

14.4 litres of demineralised water, 815 g. of the sodium salt of a disproportionated abietic acid mixture, 72 g. of a condensation product of alkylnaphthalene sulphonic acid and formaldehyde, 36 g. of sodium hydroxide and 60 g. of tetrasodium pyrophosphate. A solution containing the following components is then added:

10,620 g. of chloroprene, 1380 g. of ethylene glycol dimethacrylate, 34 g. of n-dodecylmercaptan. The reaction mixture is then heated to 43° C. and polymerisation is initiated by dropwise addition of a catalyst solution which contains 5 g. of formamidine sulphinic acid dissolved in 150 g. of demineralised water. When about 80% of the monomer has been polymerised, polymerisation is stopped by the addition of a stabiliser solution consisting of 5 g. of phenothiazine and 5 g. of p-tert.-butyl-pyrocatechol in 500 g. of benzene. The latex is then freed from unreacted monomer.

IV. Mixture of benzene soluble and benzene isoluble polychloroprene (A) The polychloroprenelatex from Example I No. 4 is mixed with the polychloroprene latex from Example III so that the mixture contains 85 parts by weight of benzene soluble and 15 parts by weight of benzene insoluble polychloroprene. The polychloroprene mixture is isolated from the mixture of latices by freeze coagulation followed by drying. (B) Experiment (A) is repeated with the latex from Example II (for comparison)

Samples of products (A) and (B) are stored at 70° C. and the change in Mooney viscosity with storage time is determined. The results are shown in Table II.

TABLE II

| | Mooney viscosity ML-4' (100° C.) after storage for y days | | | | Increase of Mooney viscosity after days |
|---|---|---|---|---|---|
| | y=0 | y=1 | y=2 | y=3 | |
| Product: | | | | | |
| B | 53 | 56 | 61 | 68 | 15 |
| A | 51 | 53 | 54 | 55 | 4 |

The product according to the invention (A) shows practically no change in its viscosity and is therefore much more stable to heat than the comparison product (B).

What is claimed is:

1. A process which comprises polymerizing a monomer composition comprising chloroprene and 0 to 50% by weight based on total monomer composition of one or more other copolymerizable monomers in an aqueous emulsion in the presence of a radical forming initiator and 0.1 to 20 parts by weight, per 100 parts by weight of monomer composition, of a dialkoxyxanthogendisulphide of the formula

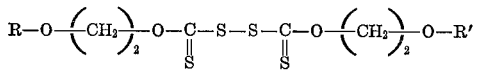

wherein R and R' are methyl or ethyl.

2. A process according to claim 1, wherein the amount of dialkoxyxanthogendisulphide is 0.15 to 1 parts by weight per 100 parts by weight of monomer composition.

3. A process according to claim 1, wherein polymerization is carried out at 0 to 80° C.

4. A process according to claim 1, wherein the other copolymerizable monomer is a conjugated diolefin, a vinyl ether, a vinyl ester, a vinyl ketone or an ester, amide or nitrile of acrylic or methacrylic acid.

References Cited
UNITED STATES PATENTS
3,190,865  6/1965  Miller _____ 260—92.3
3,669,944  6/1972  Sakomura et al. _____ 260—82.1

STANFORD M. LEVIN, Primary Examiner

U.S. Cl. X.R.

260—33.6 UA, 63 BB, 82.1, 85.5 F, 86.3, 87.1, 87.5 R, 890